United States Patent
Kiholm

(10) Patent No.: US 6,485,577 B1
(45) Date of Patent: Nov. 26, 2002

(54) PIPE PIG FORMED OF FROZEN PRODUCT

(76) Inventor: Robert Kiholm, 103 N. Third, Selah, WA (US) 98942

( * ) Notice: Subject to any disclaimer, the term of this patent is extended or adjusted under 35 U.S.C. 154(b) by 0 days.

(21) Appl. No.: 09/479,108

(22) Filed: Jan. 7, 2000

(51) Int. Cl.[7] .......................... B08B 9/04; B08B 9/053; B08B 9/055
(52) U.S. Cl. .................. 134/8; 134/22.11; 134/24; 15/104.062; 15/104.03
(58) Field of Search .................. 134/8, 22.11, 24; 15/104.061, 104.062, 104.03

(56) References Cited

U.S. PATENT DOCUMENTS

| | | | |
|---|---|---|---|
| 3,057,758 A | | 10/1962 | Walker et al. .................. 134/8 |
| 3,676,091 A | | 7/1972 | Fraser et al. .................. 48/190 |
| 3,827,282 A | | 8/1974 | Brister ...................... 73/40.5 R |
| 3,875,606 A | * | 4/1975 | Landers .................... 15/104.04 |
| 4,003,393 A | * | 1/1977 | Jaggard et al. ................ 137/15 |
| 4,135,949 A | | 1/1979 | Reese ........................... 134/18 |
| 4,275,475 A | * | 6/1981 | Schwartz et al. ......... 15/104.06 |
| 4,314,577 A | | 2/1982 | Brister .......................... 137/13 |
| 4,473,408 A | | 9/1984 | Purinton, Jr. ................... 134/8 |
| 4,537,700 A | * | 8/1985 | Purinton, Jr. ............. 252/315.1 |
| 4,543,131 A | * | 9/1985 | Purinton, Jr. ................... 134/8 |
| 4,663,795 A | * | 5/1987 | Neff ......................... 15/104.06 |
| 4,724,007 A | | 2/1988 | Barry et al. .................... 134/1 |
| 4,898,197 A | | 2/1990 | Barry et al. .................... 134/8 |
| 5,300,151 A | * | 4/1994 | Lowther ......................... 134/8 |
| 5,300,152 A | | 4/1994 | Lowther ......................... 134/8 |
| 5,622,570 A | * | 4/1997 | Lima et al. ..................... 134/5 |
| 5,685,041 A | | 11/1997 | Sivacoe ................. 15/104.061 |
| 5,795,402 A | * | 8/1998 | Hargett, Sr. et al. ............ 134/8 |
| 5,842,816 A | | 12/1998 | Cunningham ................ 405/170 |
| 5,890,531 A | | 4/1999 | Gairns et al. .................. 165/95 |
| 5,903,945 A | * | 5/1999 | Lundie .................. 15/104.061 |
| 5,911,255 A | | 6/1999 | Bond .......................... 15/3.52 |
| 5,924,158 A | | 7/1999 | Watts .................... 15/104.061 |
| 6,038,725 A | * | 3/2000 | Knapp ................... 15/104.061 |
| 6,079,074 A | * | 6/2000 | Ellett ..................... 15/104.062 |
| 6,139,644 A | * | 10/2000 | Lima .............................. 134/8 |

* cited by examiner

Primary Examiner—Randy Gulakowski
Assistant Examiner—Jiri F. Smetana
(74) Attorney, Agent, or Firm—Stratton Ballew PLLC

(57) ABSTRACT

A method and apparatus for pipe pig that is employed in a piping system for the purpose of recovering product. The pipe pig, or simply "pig," is utilized to flush or purge a piping system, which includes a pipe that is normally filled with a product stream. The pig is a substantially solid slug that is introduced into the flow within the pipe. The pipe pig includes at least a component of a product stream and the pig is at least partially frozen to achieve its substantially solid form. The pipe pig is inserted or alternatively formed within a launch chamber that junctions with a pipe. A release valve is opened to allow the pig to enter the pipe. An exterior surface of the launch chamber can be heated to prevent the pig from sticking within the launch chamber or refrigerated to form the pig. The pipe pig can be propelled into the product stream or allowed to fall by gravity or suction alone. Articulations can also be formed into the pipe pig to allow the pig to bend along its length and so allow the pig to travel around elbows and bends in the pipe. Alternatively, a freezing agent can be injected into the pipe that contains the product stream to form the pig. With product recovery using the pig, piping system waste products are minimized.

7 Claims, 4 Drawing Sheets

PIPE PIG FORMED OF FROZEN PRODUCT

TECHNICAL FIELD

The invention relates field of product recovery and the flushing of pipelines used in any fluid transfer operation and especially in piping systems utilized in the filling of containers, including bottling lines, can lines and tank filling operations. More specifically, the present invention provides a method and apparatus for a pipe pig that is formed from a substantially frozen product or a component of the product.

BACKGROUND OF THE INVENTION

Typically, the transfer of liquid materials or products demands a periodic purging or flushing of the pipe carrying the materials. This pipe may be above or below ground, or in a plant setting. Often, a particular piping system must have the ability to handle a wide variety of products or at least periodic changes in product composition. These various products may differ in terms of their viscosity, ranging from high viscosity products such as peanut butter, salad dressings, and frozen concentrated juices; medium viscosity products, such as pharmaceutical products, petroleum products, syrups, oils, soups, stews, and sauces; to low viscosity products such as wine, waters and juices. These products also vary in terms of other properties, such as temperature, pH and suspended solids. Another such property is the presence or absence of carbonation.

The purging of a piping systems results in lost product unless a system of "product recovery" is employed. Current product recovery systems are burdened with serious problems. For piping systems, the "product recovery problem" usually means that periodically, a significant quantity of product in the piping system becomes waste that cannot be economically recovered for later use. The product recovery problem typically arises in several situations with piping system designs. For example, if a piping system is used to fill tanks or containers with a variety of different products over the course of a day or a week, then each time a run for one product ends and a run for a different product begins, a considerable amount of both products becomes unrecoverable waste. Food grade piping systems handle a considerable amount of perishable products, such as carbonated products, which must be maintained at a constant temperature, especially during a bottling or container filling process. Also, pharmaceutical and technical grade products require special handling to ensure product integrity or purity. Any compromise in this purity or control translates to unrecoverable waste at, the end of each work day, or product change or alteration.

Regrettably, much of the unrecoverable product waste currently created by the liquid material processing industry is often literally dumped down the drain, or is stored in tanks or drums to later be reprocessed, taken to a landfill, or, for certain potentially hazardous products, to an appropriate hazardous waste disposal facility. In the case of food and beverage products, this unrecoverable waste is most often dumped down the drain. The "drain dumping" disposal method costs the processor more than just the value of the wasted product, because this wasted product must be treated before it is reintroduced back into the environment.

For those food processors without their own waste water treatment facility, the liquid waste product dumped into the drain travels through the sewage system to the local sewage treatment facility. The high sugar or carbohydrate content of most wasted food products then causes a population explosion in the bacteria at the sewage treatment facility. The bacteria used by sewage treatment facilities is "aerobic" bacteria, which means they use up oxygen as they consume sewage waste. Sewage treatment plants maintain a careful balance between their bacteria's population and the incoming sewage waste, to ensure adequate oxygen for their bacteria to survive. Sewage treatment plants make every effort to ensure that their entire system remains aerobic (with oxygen) rather than anaerobic (without oxygen). Aerobic bacteria do not create offensive odors when they consume sewage waste. Anaerobic bacteria create offensive odors, and are less efficient than aerobic bacteria at disposing of sewage waste. Sewage treatment plants track precisely how much high sugar content industrial waste is dumped into their system, and they charge each company dumping this waste a considerable "biological oxygen demand" (BOD) assessment, which can significantly impact profit.

Sewage treatment plants also track precisely the quantity of suspended solids contained in the waste stream they receive from industrial sources, because the required treatment of these suspended solids is expensive. Suspended solids are present in unfiltered fruit juices, soups, sauces, peanut butter, condiments, and a wide variety of other products. In addition to a monthly B.O.D. assessment, sewage treatment plants also charge their industrial sewage sources a monthly suspended solids assessment.

For those processing companies that elect to build their own waste water treatment facility, they must incur the expense of building, maintaining, and operating their own facility. This cost, which can be considerable, is often incurred primarily because of their decision to dump wasted product down the drain. Accordingly, there is a great need for solutions to the problem of product recovery.

SUMMARY OF INVENTION

The invention provides a method and apparatus for pipe pig that is employed in a piping system for recovering a product. Specifically, the present invention provides a pipe pig or simply referred to as a "pig" and a method of utilizing the pipe pig as an instrument to flush or purge the piping system, which is includes a pipe that is normally filled with a product stream. The pig is a substantially solid slug in the flow of the pipe. The pipe pig includes at least a component of a product stream and the pig is at least partially frozen to achieve its substantially solid form.

A preferred method of the invention includes providing the pipe pig within a launch chamber. The launch chamber has a junction with a pipe. The pipe conducts the product stream past the launch chamber. The pipe pig, as provided within the launch chamber, is substantially frozen and formed from at least a component of the product stream.

A release valve is opened to allow the pipe pig to enter the pipe of the product. Preferably, the release valve is normally closed to partition the launch chamber from the pipe. The release valve is positioned proximate the junction between the launch chamber and the pipe of the product stream. An exterior surface of the launch chamber can be heated to prevent the pipe pig from sticking within the launch chamber when the pipe pig is released into the pipe containing the product stream.

The pipe pig can be either be propelled into the product stream, or allowed to fall by gravity or suction alone. One alternative that can be utilized to propel the pipe pig into the pipe of the product stream is to blow a quantity of an agent into the launch chamber. Additional quantities of the agent can be blown into the launch chamber to further propel the pipe pig within the pipe of the product stream. Blowing the agent into the launch chamber can be utilized to form a slug of agent in the pipe of the process stream, behind the pipe pig.

Articulations can also be formed into the pipe pig. These articulations preferably include slots into the pipe pig. The articulations allow the pipe pig to bend along the length of the pipe pig and so allow the pipe pig to travel around elbows and bends in the pipe.

The pipe pig can be formed external to the launch chamber by freezing a liquid to form the pipe pig and loading the pipe pig into the launch chamber through a chamber access. To prevent the pipe pig from prematurely entering into the pipe from the launch chamber, and also to prevent the product stream from entering the launch chamber and exiting through the chamber access, a released valve located proximate the junction between the launch chamber and the pipe is closed prior to loading the pipe pig into the launch chamber.

In a preferred alternative, the pipe pig can be formed from a semisolid ice material. The semisolid ice material contains at least a component of the product stream. The semisolid ice material is introduced into the launch chamber after closing the release valve. The semisolid material can be formed by first substantially freezing at least a component of the product stream to form a frozen material. The frozen material is then shaved, or in some similar method, reduced into particles of a size that can be introduced into the launch chamber. In this way, the shaved frozen material forms the semisolid ice material.

The pipe pig can be formed within the launch chamber from a liquid, the liquid being at least a component of the product stream. The liquid is substantially frozen within the lunch chamber to form the pipe pig. The freezing of the liquid is preferably accomplished by refrigerating an exterior surface of the launch chamber. Articulations can also be formed along the length of the pipe pig while the pipe pig is formed within the launch chamber. To form articulations into the pipe pig, a plurality of opposed valves are positioned along the length of the launch chamber. This plurality of opposed valves are partially closed prior to freezing the liquid in the launch chamber. The plurality of opposed valves are then opened after the freezing of the liquid. To aid in opening the plurality of opposed valves, heat can be applied to the plurality of opposed valves prior to the opening them.

In a preferred alternative method of forming the pipe pig, a quantity of a super-cooled freezing agent is injected into the pipe that contains the product stream. The freezing agent substantially freezes a portion of the product stream, to form the pipe pig. A propelling agent can then be injected into the pipe of the product stream to propel the pipe pig through the pipe. A filling agent can be injected into the pipe of the process stream to form a slug of the filling agent in the pipe, behind the pipe pig.

The present invention can be employed in the food, beverage and pharmaceutical industries, as well as in the processing of petroleum products, chemicals or water, and can be utilized for product recovery in any material handling operation that includes a pipe transfer of a flowable product.

An object of the invention is that the pipe pig is employed as an instrument for product recovery in a piping system. The use of the pipe pig in this way has the advantage of minimizing product losses during product change-out or interruption that would conventionally result in the loss of a significant quantity of product that must be used to flush the pipe line. With product recovery using the pipe pig method of the present invention, the amount of waste product that must be discarded from a piping system when the system is shut down, or a change is made from one product to another, is minimized.

An additional advantage of the invention is that the pipe-pig is formed from at least a component of the process stream flowing within the pipe. This eliminates the need to retrieve the pig from the system. The frozen pipe pig simply melts when it reaches its destination or if it becomes inadvertently lodged within the pipe.

The invention will be better understood by reference to the following detailed description taken in conjunction with the accompanying drawings.

DETAILED DESCRIPTION OF SPECIFIC EMBODIMENTS

Industrial piping systems handle a wide variety of products, such as juice, juice concentrates, carbonated beverages, wine, beer, liquid medicines, and petroleum products—to name a few. The present invention, as shown in FIGS. 1 through 4, provides a method and apparatus for purging or flushing a product from a piping system by employing a pipe pig 10. The present invention allows for the product to be recovered without dilution, mixing or contamination with another liquid material. The pipe pig can be simply referred to as a "pig." The pig of the present invention is essentially a specialized slug of material that includes at least a single component of the product stream. The pig is frozen to a substantially solid form and so can be employed to push a product 11 within a pipe 12, ahead of the pig. The pipe, as shown in FIGS. 1 through 4, is a representation of a segment of the pipe, as would be found in a piping system employing the present invention. The individual and unique diameter, length, material make-up and wall thickness of the pipe are specified by the designers of the piping system. The present invention endeavors to universally service a wide variety of piping system designs.

Figure 1:
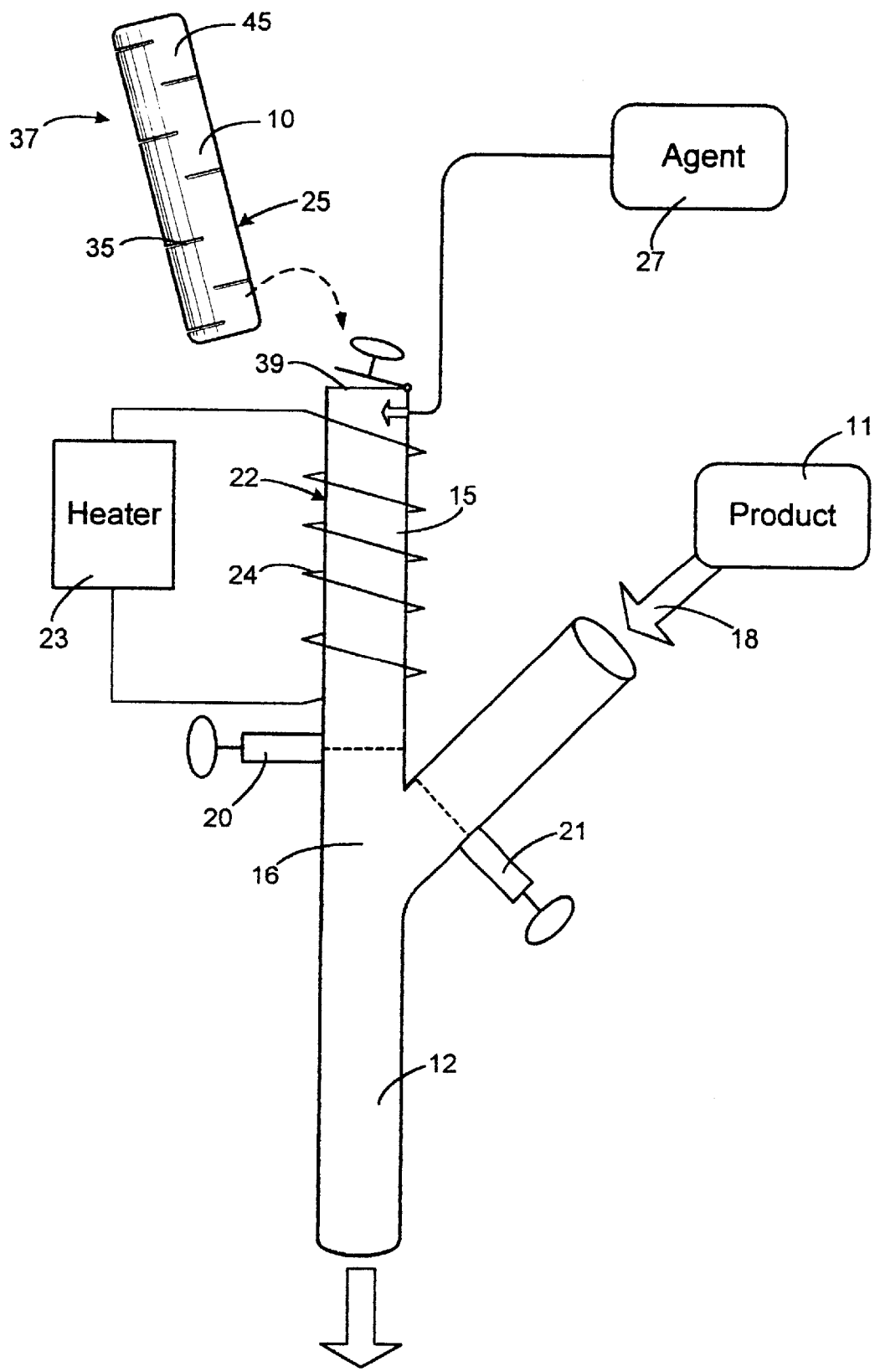
FIG. 1 is a schematic diagram of a preferred embodiment of the present invention.
Figure 2:
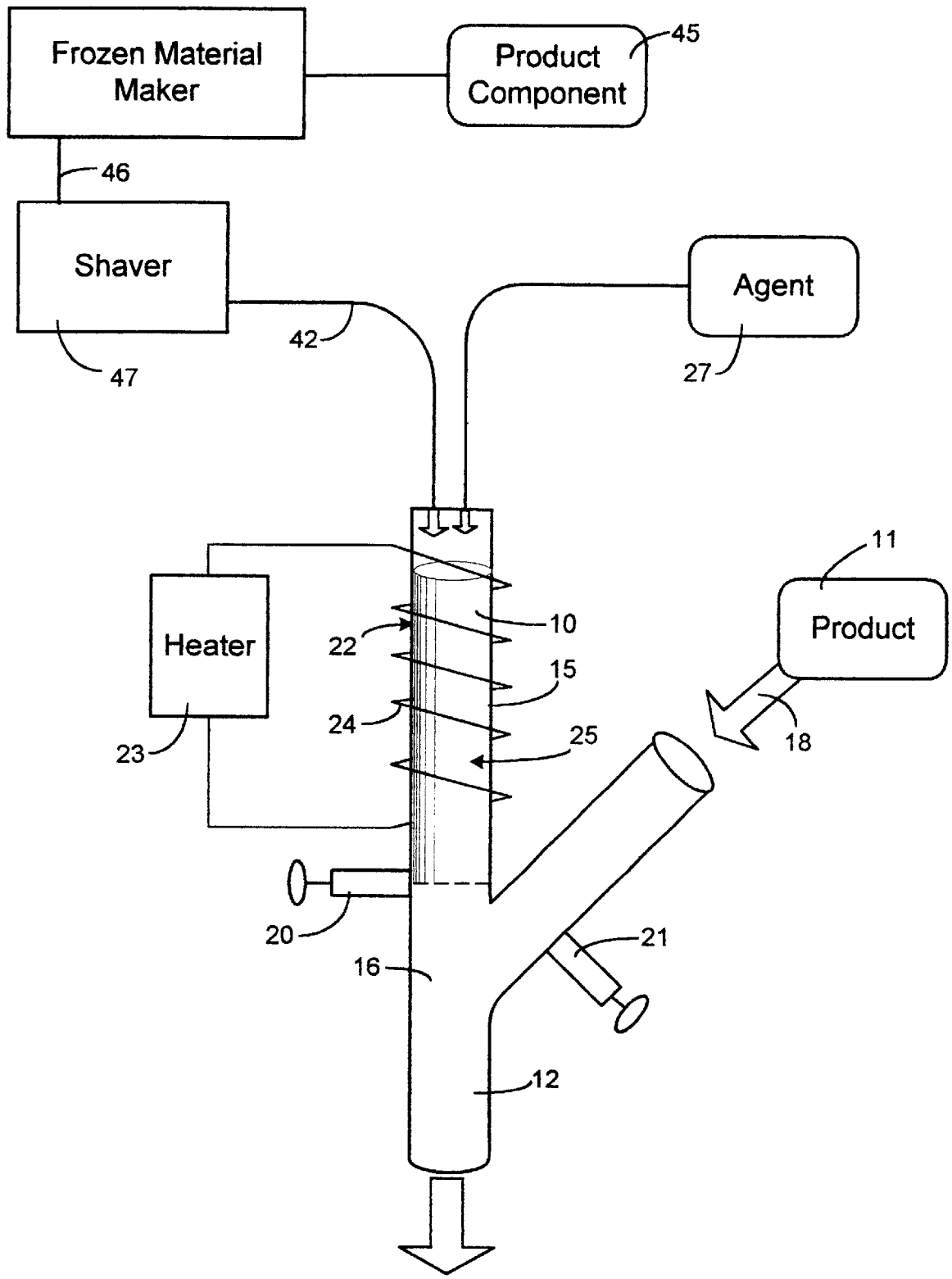
FIG. 2 is a schematic diagram of a preferred embodiment of the present invention.
Figure 3:
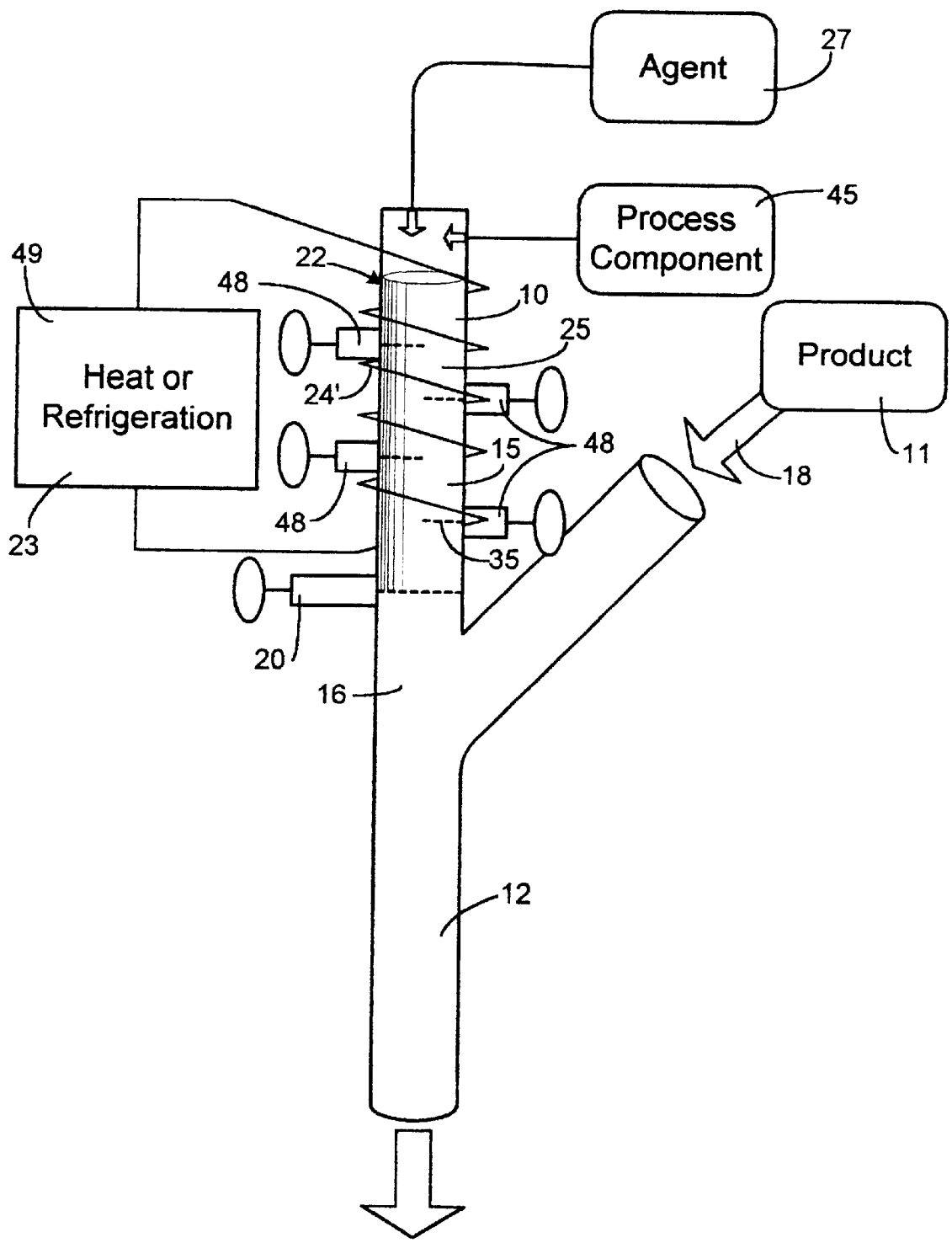
FIG. 3 is a schematic flow diagram of a preferred embodiment of the present invention.

A preferred method of the invention includes locating the pipe pig 10 within a launch chamber 15, as shown in FIGS. 1 through 3. The launch chamber has a junction 16 with the pipe 12. The junction is preferably a Y-type junction and the launch chamber is preferably, a "dead end" leg of the Y. The pipe conducts a product stream 18 past the launch chamber at the junction, and so passing through the Y in the pipe.

As shown in FIGS. 1 through 3, a release valve 20 is opened to allow the pipe pig 10 to enter the pipe 12 carrying the product stream 18, at the junction 16 of the pipe. Preferably, the release valve is normally closed to partition the launch chamber from the pipe. A standard gate valve is most preferred. However, a knife valve is considered as an alternative. The piping and product properties, as well as service requirements and expense are all typical factors in the selection of the release valve and all of the other valves shown and described in relation to the present invention. The release valve is positioned proximate the junction between the launch chamber and the product stream pipe. Preferably the release valve is positioned as close as possible to the junction, to minimize any head space or eddies in the product stream as it flows past the release valve in its normally closed position.

As shown in FIGS. 1 through 3, a check valve 21 is positioned in the pipe 12, directly up stream, above the junction 16 with the launch chamber. The check valve can be any appropriate type of valve and is most preferably a normally open valve that is interlocked with the operation of the release valve 20, so that when the release valve opens, the check valve is closed. The check valve prevents any materials from traveling upstream in the pipe, against the normal direction of the product stream 18.

An exterior surface 22 of the launch chamber 15 can be heated, as shown in FIGS. 1 and 2. A heater 23 is preferably employed to heat the launch chamber's exterior. Most preferably the heater serves a coil 24 that wraps around substantially the entire length of the launch chamber. Process hot water, or hot water recycled or recovered from another operation with the plant or facility can be circulated within the piping coil.

Alternatively, resistance electric heat can be utilized, in which the heater 23 applies a voltage drop across the coil 24 to heat the launch chamber 15. The coil can include a standard heat tape, which is often employed to heat piping. The purpose of the heating of the exterior surface 22 of the launch chamber is to prevent the pipe pig 10 from sticking within the launch chamber, especially when the pipe pig is released into the pipe 12 containing the product stream 18. The heating of the exterior surface of the launch chamber warms an outer surface 25 of the pipe pig, lowering the surface friction of the pipe pig as it slides through the pipe. The frictional heat that builds on the outer surface of the pipe pig once it is released into the pipe, maintains a low friction surface film on the outer surface of the pipe pig.

The pipe pig 10 can be propelled into the product stream 18 or allowed to fall by gravity or suction alone. By introducing an agent 27, into the launch chamber 15 to displace the pipe pig, the suction of the product stream will pull the pig out of the launch chamber and into the pipe 12. The agent 27 can be either a gas or a liquid. In an alternative embodiment, a sufficient quantity of the agent can be forced or blown into the launch chamber to propel the pig into the pipe of the product stream. A mechanical device, such as a ram or drive could be alternatively employed to force the pig into the pipe.

Figure 4:
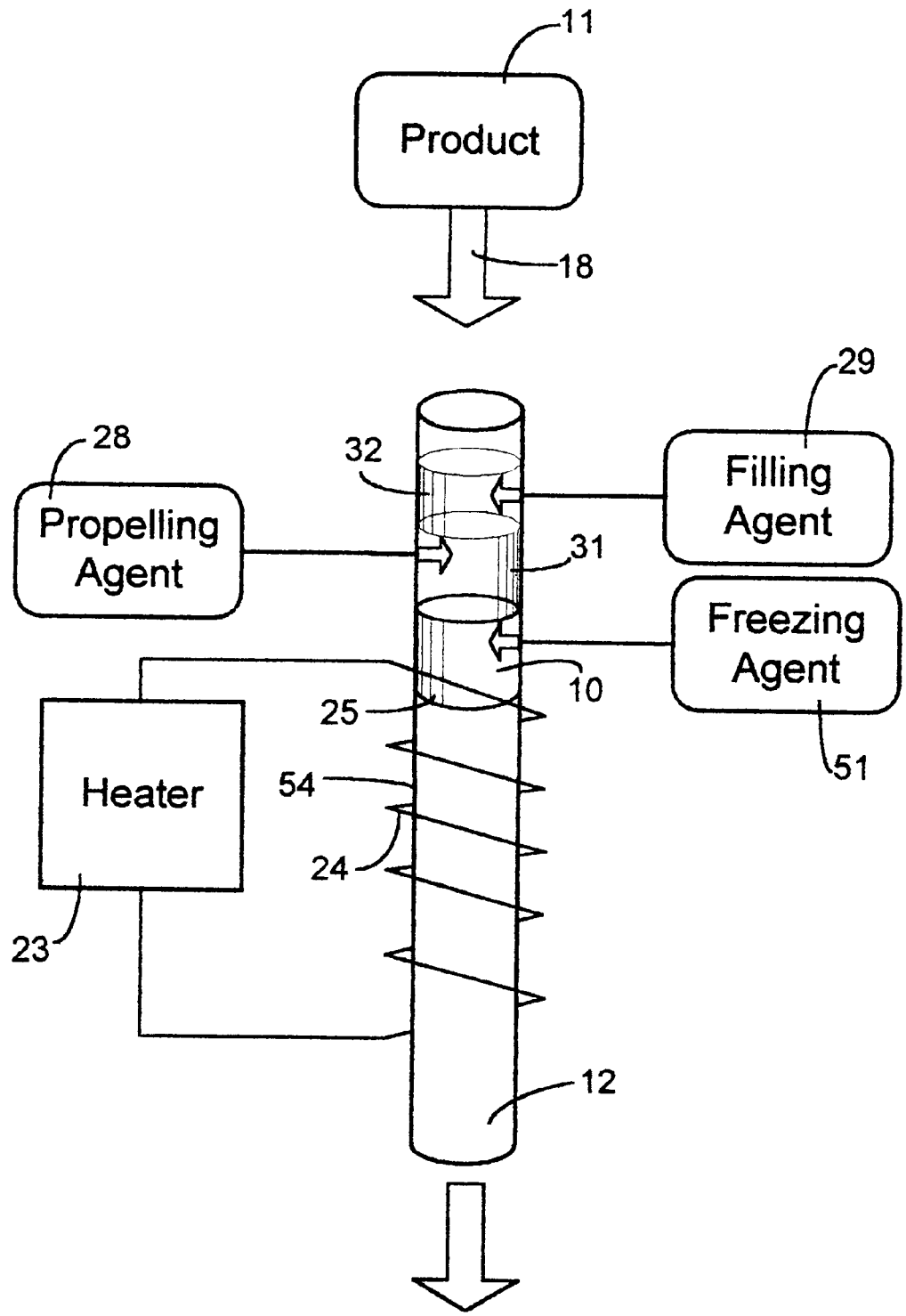
FIG. 4 is a schematic flow diagram of a preferred embodiment of the present invention.

Additional quantities of the agent 27 can be blown into the launch chamber 15 to further propel the pipe pig 10 within the pipe 12 of the product stream 18. The agent that is blown into the launch chamber can further form a slug of the agent behind the pig as it travels in the pipe. As shown in FIG. 4, the agent that forms this propelling slug 31 can also be referred to as a propelling agent 28. Alternatively, additional quantities of the agent can be blown into the launch chamber to fill in behind the pig. As also shown in FIG. 4, the agent that forms this filling slug 32 can be referred to as a filling agent 29. This slug of the filling agent is a specific quantity of the filling agent that can backfield behind the pig for the purpose of preventing suction potentially formed behind the pig as it travels. This suction can slow the pig or perhaps stop its progress down the pipe. Also, the agent, when used as a filling agent, forms a buffer between the product ahead of the pig and any remaining product left behind the pig. FIG. 4 shows the serial order of the pig, the propellant agent and filling agent that can be employed in the present invention. The filling slug or segment of the filling agent is shown in the pipe of the process stream, following the propelling slug, which is behind the pig.

Preferably, the agent 27, as shown in FIGS. 1, 2, and 3, and likewise, the propelling agent 28 and the filling agent 29, as shown in FIG. 4, are all process air. If the propelling agent is identical to the filling agent, the propelling agent and the filling agent can be, as preferred, fed into the pipe from the same inlet. Instead if process air, any appropriate liquid or gas could be utilized for anyone or all of the agents, as required to best suit the specific application. Preferably, these agent are all process air, but each can alternatively be any liquid or gas that has the desired qualities for the specific application, such as sterile air, water, a product component or any easily recoverable commodity.

Articulations 35 in the pipe pig 10, as shown in FIG. 1, can also be formed into the pig. These articulations preferably include slots that allow the pig to bend along its length. The bending of the pig gives it the ability to travel around sweeping radius elbows and smooth bends in the pipe.

As suggested in FIG. 1, the pipe pig 10 can be formed externally form the launch chamber 15. A suitable material, preferably a liquid that is at least a component of the product 11, can be used to form the substantially frozen pig. Because water performs well a material for forming the pig and water is a typical component of most products, be it present in only minute amounts, water is a preferred material for forming the pipe pig. A performed pig 37, as preferably formed in a refrigerated mold, is loaded into the launch chamber through a chamber access 39. To prevent the pipe pig from prematurely entering into the pipe 12 and to prevent the product stream 18 from entering the launch chamber and exiting through the chamber access, the released valve 20 is closed prior to loading the pipe pig into the launch chamber.

Alternatively, the pipe pig 12 can be formed from a semisolid ice material 42, as shown in FIG. 2. The semisolid ice material is preferably comprised of at least a product component 45 of the product stream. Like the material used to form the performed pig 37, the product component selected for the semisolid ice material is preferably water. However, because the semisolid ice material is not formed into a substantially solid mold, a wider variety of materials can still perform acceptably. After substantially freezing at least a component of the product stream to form a frozen material 46, the frozen material is mechanically reduced in a shaver 47 to form the semisolid ice material. Any method of reducing the frozen material to particles of a size that can be introduced into the launch chamber can be used as an alternative to shaving. The semisolid ice material is then introduced into the launch chamber 15.

As an additional alternative of the present invention, the pipe pig 10 can be formed within the launch chamber 15 from a product component 45, as shown in FIG. 3. The product component is preferably a liquid and is at least a component of the product stream 18. The product component is substantially frozen within the lunch chamber to form the pipe pig. The freezing of the pipe pig is preferably accomplished by a refrigerating 49 of the exterior surface 22 of the launch chamber. This refrigeration is preferably accomplished by a coil 24' that circles the length of the launch chamber and circulates and appropriate refrigerant or chilled brine solution.

Articulations can also be formed along the length of the pipe pig 10, even when the pipe pig is formed within the launch chamber 15. To form these articulations into the pipe pig, a plurality of opposed valves 48 are preferably positioned along the length of the launch chamber, as shown in FIG. 3. The plurality of opposed valves are partially closed prior to freezing the process component within the launch chamber. The plurality of opposed valves are then opened after the freezing of the liquid. This forms the articulations 35 in the pipe pig, just as the articulations shown in the pipe pig of FIG. 1.

To aid in opening the plurality of opposed valves 48, heat can be applied to the plurality of opposed valves prior to the opening them. Preferably, as shown in FIG. 3, the same coil 24' that supplied the refrigeration 49 to the exterior surface 22 of the launch chamber 15 can be utilized with the heater 23 to heat the exterior surface of the launch chamber.

In a preferred alterative method of the present invention, as shown in FIG. 4, the pipe pig 10 can be formed within the pipe 12 that is carrying the product stream 18. In this alternative to the launch chamber 15, a quantity of a freezing agent 51 is injected directly into the pipe that contains the product stream. The freezing agent substantially freezes a portion of the product stream, to form the pipe pig. To accomplish this freezing, the freezing agent typically mixes with a small quantity of the product stream in forming the pig. The freezing agent is preferably a super-cooled liquid or gas. Nitrogen, argon, oxygen, propane, and air are examples of suitable freezing agents that could be selected for certain applications of the present invention. The temperature of the introduced freezing agent and the selection of the freezing agent directly depends on the product stream, its composition, rate of flow and physical state.

As an additional alternative, the freezing agent 51 can be a solid material, preferably in the form of a chunk, particle or pellet. The freezing agent, when a solid material, forms the pig 10 in solution with the product 11 in the pipe 12. A preferred solid freezing agent is cubes of water ice. Alternatively, ice particles or cubes, formed of the product or any component of the product stream 18 could be used.

Behind the pipe pig 10, the propelling agent 28 can then be injected into the pipe 12 of the product stream 18 to propel the pipe pig through the pipe. In addition or as an alternative to the propelling agent, the filling agent 29 can be injected into the pipe of the process stream to form a slug of the filling agent in the pipe, also behind the pipe pig. As with the embodiments that employ the launch chamber 15, the heater 23 can be utilized to prevent the pipe pig from sticking to the pipe as the pig is formed. The heater, as shown in FIG. 4 is equivalent to the heater shown in FIGS. 1 through 3, in that it supplies heat by way of the coil 24, which in the embodiment of FIG. 4, preferably encircles an exterior surface 54 of the pipe.

It is contemplated that the execution of the method of the present invention can be fully automated by the use of automated device controllers, logic circuits, and suitable automatic sensor devices. It is intended that the "pipe system operator," and the "discretion of the pipe system operator," in the present invention can be replaced by automated equipment, sensor devices and logic circuits. Accordingly, the description of the apparatus and method steps of the present invention are believed to be, and are intended to be, sufficient to permit a person skilled in the art of designing and programming automated control systems to fully automate, without undue experimentation, a product recovery system utilizing the pipe pig method that is the subject of the present invention.

Although the invention has been illustrated and described with respect to exemplary embodiments thereof, it should be understood by those skilled in the art that the foregoing and various other changes, omissions and additions may be made therein and thereto, without departing from the spirit and scope of the present invention. Therefore, the present invention should not be understood as limited to the specific embodiment set forth herein but to include all possible embodiments which can be embodied within the scope encompassed and equivalents thereof with respect to the features set out in the appended claims.

In compliance with the statutes, the invention has been described in language more or less specific as to structural features and process steps. While this invention is susceptible to embodiment in different forms, the specification illustrates preferred embodiments of the invention with the understanding that the present disclosure is to be considered an exemplification of the principles of the invention, and the disclosure is not intended to limit the invention to the particular embodiments described. Those with ordinary skill in the art will appreciate that other embodiments and variations of the invention are possible which employ the same inventive concepts as described above. Therefore, the invention is not to be limited except by the following claims, as appropriately interpreted in accordance with the doctrine of equivalents.

The following is claimed:

1. A method for a pipe pig for use in a piping system, including the steps of:
    a) providing a pipe pig within a launch chamber, the launch chamber having a junction with a pipe, the pipe for conducting a product stream past the launch chamber, and the pipe pig being substantially frozen and including at least a component of the product stream;
    b) providing a semisolid ice material, the semisolid ice material comprising of at least a component of the product stream;
    c) substantially freezing at least a component of the product stream to form a frozen material;
    d) converting the frozen material into shaved particles, the shaved particles combined to form the semisolid ice material;
    e) closing the release valve;
    f) introducing the semisolid ice material into the launch chamber
    g) opening a release valve from a closed position, the release valve positioned proximate the junction between the launch chamber and the pipe of the product stream; and
    h) releasing the pipe pig into the pipe of the product stream to purge the pipe of the product.

2. A method for a pipe pig for use in a piping system, including the steps of:
    a) providing a pipe pig within a launch chamber, the launch chamber having a junction with a pipe, the pipe for conducting a product stream past the launch chamber, and the pipe pig being substantially frozen and including at least a component of the product stream;
    a1) filling the launch chamber with a quantity of a liquid, the liquid being at least a component of the product stream;
    a2) substantially freezing the liquid in the launch chamber to form the pipe pig;
    a2a) forming articulations into the pipe pig, the articulations including slots, the articulations allowing the pipe pig to bend along the length of the pipe pig;

a2b) partially closing a plurality of opposed valves in the launch chamber prior to freezing the liquid in the launch chamber, the plurality of opposed valves positioned along the length of the launch chamber;

a2c) opening the plurality of opposed valves after the freezing of the liquid;

b) opening a release valve from a closed position, the release valve positioned proximate the junction between the launch chamber and the pipe of the product stream; and c) releasing the pipe pig into the pipe of the product stream to purge the pipe of the product.

3. The method of claim 2 wherein the step opening the plurality of opposed valves additionally includes the step of:

a2c1) heating the plurality of opposed valves prior to the opening of the opposed valves.

4. A method. for a pipe pig for use in a piping system, including the steps of:

a) providing a pipe pig within a launch chamber, the launch chamber having a junction with a pipe, the pipe for conducting a product stream past the launch chamber, and the pipe pig being substantially frozen and consisting of at least a component of the product stream;

b) opening a release valve from a closed position, the release valve positioned proximate the junction between the launch chamber and the pipe of the product stream;

c) releasing the pipe pig into the pipe of the product stream to purge the pipe of the product;

d) blowing a quantity of an agent into the launch chamber to propel the pipe pig from the launch chamber and into the pipe of the product stream; and e) blowing an additional quantity of the agent into the launch chamber to propel the pipe pig within the pipe of the product stream.

5. A method for a pipe pig for use in a piping system, including the steps of:

a) providing a pipe pig within a launch chamber, the launch chamber having a junction with a pipe, the pipe for conducting a product steam past the launch chamber, and the pipe pig being substantially frozen and consisting of at least a component of the product stream;

b) opening a release valve from a closed position, the release valve positioned proximate the junction between the launch chamber and the pipe of the product stream;

c) releasing the pipe pig into the pipe of the product stream to purge the pipe of the product;

d) blowing a quantity of an agent into the launch chamber to propel the pipe pig from the launch chamber and into the pipe of the product stream; and e) blowing an additional quantity of the agent into the launch chamber to form a slug of agent in the pipe of the process stream, behind the pipe pig.

6. A method for a pipe pig for use in a piping system, including the steps of:

a) providing a pipe pig within a launch chamber, the launch chamber having a junction with a pipe, the pipe for conducting a product stream past the launch chamber, and the pipe pig being substantially frozen and consisting of at least a component of the product steam;

b) opening a release valve from a. closed position, the release valve positioned proximate the junction between the launch chamber and the pipe of the product stream;

c) releasing the pipe pig into the pipe of the product stream to purge the pipe of the product; and d) applying heat to an exterior surface of the launch chamber to prevent the pipe pig from sticking within the launch chamber as the pipe pig is released.

7. A method for a pipe pig for use in a piping system, including the steps of:

a) providing a pipe pig within a launch chamber, the launch chamber having a junction with a pipe, the pipe for conducting a product stream past the launch chamber, and the pipe pig being substantially frozen and consisting of at least a component of the product stream;

b) forming articulations into the pipe pig, the articulations including slots, the articulations allowing the pipe pig to bend along the length of the pipe pig;

c) opening a release valve from a closed position, the release valve positioned proximate the junction between the launch chamber and the pipe of the product stream; and d) releasing the pipe pig into the pipe of the product stream to purge the pipe of the product.

* * * * *